United States Patent
Venugopal et al.

(10) Patent No.: US 12,028,148 B2
(45) Date of Patent: *Jul. 2, 2024

(54) RECOVERY MECHANISM FOR SECONDARY CELL

(71) Applicant: QUALCOMM Incorporated, San Diego, CA (US)

(72) Inventors: Kiran Venugopal, Green Brook, NJ (US); Jung Ho Ryu, Fort Lee, NJ (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,588

(22) Filed: Dec. 15, 2022

(65) Prior Publication Data

US 2023/0122288 A1 Apr. 20, 2023

Related U.S. Application Data

(63) Continuation of application No. 17/327,094, filed on May 21, 2021, now Pat. No. 11,552,694, which is a
(Continued)

(51) Int. Cl.
*H04B 7/08* (2006.01)
*H04W 24/10* (2009.01)
(Continued)

(52) U.S. Cl.
CPC ............ *H04B 7/088* (2013.01); *H04W 24/10* (2013.01); *H04W 36/06* (2013.01); *H04W 36/30* (2013.01);
(Continued)

(58) Field of Classification Search
CPC . H04B 7/02; H04B 7/022; H04B 7/04; H04B 7/0404; H04B 7/0408; H04B 7/043;
(Continued)

(56) References Cited

U.S. PATENT DOCUMENTS 8,452,284 B2   5/2013   Seki
10,440,699 B2  10/2019  Yamada
(Continued)

FOREIGN PATENT DOCUMENTS

CN   108513737 A   9/2018
CN   108810922 A   11/2018
(Continued)

OTHER PUBLICATIONS

Apple Inc: "Consideration on Beam Measurement and Reporting Enhancement", 3GPP TSG RAN WG1 Meeting #95, R1-1812921, Spokane, USA, Nov. 12-16, 2018, the Whole Document, pp. 1-9.
(Continued)

*Primary Examiner* — Young T. Tse
(74) *Attorney, Agent, or Firm* — Patterson & Sheridan LLP/ QUALCOMM Incorporated

(57) ABSTRACT

Aspects of the present disclosure relate to wireless communications, and more particularly, to cell recovery techniques. One example method generally includes receiving, on a first cell, an indication that one or more channel measurements are to be reported for a second cell for which beam failure is detected; transmitting a first message triggering reporting of at least one preferred beam for communicating on the second cell, the first cell being different from the second cell, wherein the first message is transmitted in response to the indication that the one or more channel measurements are to be reported; receiving a report indicating the at least one preferred beam; and configuring a transmission configura-
(Continued)

tion state in accordance with the at least one preferred beam for communicating on the second cell.

48 Claims, 11 Drawing Sheets

Related U.S. Application Data continuation of application No. 16/727,678, filed on Dec. 26, 2019, now Pat. No. 11,018,750.

(60) Provisional application No. 62/787,937, filed on Jan. 3, 2019.

(51) Int. Cl.
*H04W 36/06* (2009.01)
*H04W 36/30* (2009.01)
*H04W 36/36* (2009.01)
*H04W 48/12* (2009.01)
*H04W 72/044* (2023.01)
*H04W 72/23* (2023.01)
*H04W 72/542* (2023.01)
*H04W 76/19* (2018.01)

(52) U.S. Cl.
CPC ........... *H04W 36/36* (2013.01); *H04W 48/12* (2013.01); *H04W 72/046* (2013.01); *H04W 72/23* (2023.01); *H04W 72/542* (2023.01); *H04W 76/19* (2018.02)

(58) Field of Classification Search
CPC ....... H04B 7/046; H04B 7/088; H04W 24/10; H04W 36/0061; H04W 24/04; H04W 24/06; H04W 24/30; H04W 24/36; H04W 36/04; H04W 36/06; H04W 36/30; H04W 36/36; H04W 48/12; H04W 72/02; H04W 72/042; H04W 72/0446; H04W 72/046; H04W 72/085; H04W 72/1284; H04W 72/1289; H04W 74/004; H04W 74/006; H04W 76/19
USPC ....... 375/259, 260, 262, 265, 267, 340, 341, 375/346; 370/208, 336, 337, 339, 345, 370/347; 455/444, 446, 456.5, 456.6, 455/463, 500, 552.1, 553.1, 561
See application file for complete search history.

(56) References Cited

U.S. PATENT DOCUMENTS

| | | | |
|---|---|---|---|
| 10,992,369 | B2 | 4/2021 | Venugopal et al. |
| 11,018,750 | B2 | 5/2021 | Venugopal et al. |
| 2010/0103834 | A1 | 4/2010 | Gorokhov et al. |
| 2011/0312353 | A1 | 12/2011 | Banister et al. |
| 2015/0215829 | A1 | 7/2015 | Chang et al. |
| 2016/0242182 | A1 | 8/2016 | Chen et al. |
| 2017/0013611 | A1 | 1/2017 | Dinan |
| 2018/0227899 | A1* | 8/2018 | Yu .......................... H04W 74/08 |
| 2019/0089447 | A1 | 3/2019 | Sang et al. |
| 2019/0149305 | A1 | 5/2019 | Zhou et al. |
| 2019/0150161 | A1 | 5/2019 | Cheng et al. |
| 2019/0166645 | A1 | 5/2019 | Sadiq et al. |
| 2019/0190582 | A1* | 6/2019 | Guo ....................... H04L 1/0061 |
| 2019/0253949 | A1 | 8/2019 | Park et al. |
| 2019/0306909 | A1 | 10/2019 | Zhou et al. |
| 2019/0320355 | A1 | 10/2019 | Da Silva |
| 2020/0045767 | A1 | 2/2020 | Velev et al. |
| 2020/0137821 | A1 | 4/2020 | Cirik et al. |
| 2020/0220608 | A1 | 7/2020 | Venugopal et al. |
| 2020/0220609 | A1 | 7/2020 | Venugopal et al. |
| 2021/0185754 | A1 | 6/2021 | Da Silva et al. |
| 2021/0351836 | A1 | 11/2021 | Venugopal et al. |

FOREIGN PATENT DOCUMENTS

| | | |
|---|---|---|
| CN | 108882327 A | 11/2018 |
| EP | 3557778 A1 | 10/2019 |
| WO | 2018164332 A1 | 9/2018 |
| WO | 2018169848 | 9/2018 |
| WO | 2018204255 A1 | 11/2018 |
| WO | 2018237400 A1 | 12/2018 |
| WO | 2019032882 A1 | 2/2019 |
| WO | 2019130523 A1 | 7/2019 |
| WO | 2019196118 A1 | 10/2019 |
| WO | 2020142375 | 7/2020 |

OTHER PUBLICATIONS

Apple Inc: "Remaining Issues on Multi-Beam Operation", R1-1912824, 3GPP TSG RAN WG1 #99, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 14 Pages, XP051823624, p. 4, chapter 3.1.

Asustek: "Discussion on Enhancements on Multi-Beam Operation", R1-1813575, 3GPP TSG RAN WG1 Meeting #95, Spokane, USA, Nov. 12-16, 2018, 3 Pages, URL: https://www.3gpp.org/ftp/tsg_ran/wg1_rl1/TSGR1_95/Docs/.

AT&T: "Enhancements on Multi-Beam Operation for NR", R1-1812868, 3GPP TSG-RAN WG1 Meeting #95, Spokane, USA, Nov. 12-16, 2018, 3 Pages, URL: https://www.3gpp.org/ftp/tsg_ran/wg1_rl1/TSGR1_95/Docs/.

CATT: "Enhancements on Multi-Beam Operation", 3GPP TSG RAN WG1 Meeting #95, R1-1812636, Spokane, USA, Nov. 12-16, 2018, 9 Pages.

CATT: "Remaining Issues on Multi-Beam Enhancements", 3GPP Draft, R1-1912177, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823255, 6 Pages, Section 2.1. Proposal 2.

Cewit: "Non-Codebook Based UL Transmission Enhancement in Rel. 16", 3GPP Draft, 3GPP TSG RAN WG1 Meeting #95, R1-1813373_ON_FAST_SRS_PRECODER_UPDATION, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555405, 6 Pages, Section 2.

CMCC: "Enhancements on Multi-Beam Operation", 3GPP TSG RAN WG1 #96, R1-1902339, Athens, Greece, Feb. 25- Mar. 1, 2019, 5 Pages, https://www.3gpp.org/ftp/tsg_ran/WG1_RL1/TSGR1_96/Docs/R1-1902339.zip.

CMCC: "Enhancements on Multi-Beam Operation", R1-1812888, 3GPP TSG RAN WG1 Meeting #95, Spokane, USA, Nov. 12-16, 2018, 4 Pages, URL: https://www.3gpp.org/ftp/tsg_ran/wg1_rl1/TSGR1_95/Docs/.

Convida Wireless: "On Beam Failure Recovery for SCell", 3GPP Draft, 3GPP TSG-RAN WG1 #99, R1-1913140, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823779, pp. 1-6, the whole document.

Convida Wireless: "On Beam Failure Recovery for Scell", 3GPP Draft, 3GPP TSG-RAN WG1 Meeting #95, R1-1813624, On Beam Failure Recovery for Scell, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555682, 4 pages, the whole document.

Convida Wireless: "On Beam Failure Recovery for SCell", 3GPP TSG-RAN WG1 #96, R1-1903159, Athens, Greece, Feb. 25-Mar. 1, 2019, pp. 1-6, https://www.3gpp.org/ftp/tsg_ran/WG1_RL1/TSGR1_96/Docs/R1-1903159.zip.

(56) References Cited

OTHER PUBLICATIONS

Ericsson: "Enhancements on Multi-Beam Operation", R1-1813267, 3GPP TSG-RAN WG1 Meeting #95, Spokane, USA, Nov. 12-16, 2018, pp. 1-9, URL: https://www.3gpp.org/ftp/tsg_ran/wg1_rl1/TSGR1_95/Docs/.
Fraunhofer Iis., et al., "Enhancements on UE Multi-Beam Operation", R1-1813132, 3GPP TSG RAN WG1 Meeting #95, Spokane, USA Nov. 12-16, 2018, 5 Pages, URL: https://www.3gpp.org/ftp/tsg_ran/wg1_rl1/TSGR1_95/Docs/.
Fujitsu: "Discussion on Beam Failure Recovery for SCell", R1-1812416, 3GPP TSG RAN WG1 Meeting #95, Spokane, USA, Nov. 12-16, 2018, pp. 1-4, URL: https://www.3gpp.org/ftp/tsg_ran/wg1_rl1/TSGR1_95/Docs/.
Fujitsu: "Enhancements on Multi-beam Operation", 3GPP TSG RAN WG1 Meeting #96, R1-1902074, Athens, Greece, Feb. 25-Mar. 1, 2019, pp. 1-6, https://www.3gpp.org/ftp/tsg_ran/WG1_RL1/TSGR1_96/Docs/R1-1902074.zip.
Huawei, et al., "Enhancements on Multi-Beam Operation", 3GPP TSG RAN WG1 Meeting #96, R1-1901568, Athens, Greece, Feb. 25-Mar. 1, 2019, 10 Pages, https://www.3gpp.org/ftp/tsg_ran/WG1_RL1/TSGR1_96/Docs/R1-1901568.zip.
Huawei, et al., "Enhancements on Multi-Beam Operation", 3GPP TSG RAN WG1 Meeting #99, 3GPP Draft, R1-1911903, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 7 Pages, XP051823085, Section 3.5.
Huawei et al., "Enhancements on Multi-Beam Operation", R1-1812244, 3GPP TSG RAN WG1 Meeting #95, Spokane, USA, Nov. 12-16, 2018, 6 Pages, URL: https://www.3gpp.org/ftp/tsg_ran/wg1_rl1/TSGR1_95/Docs/.
Intel Corporation: "Discussion on Multi-Beam Enhancements", 3GPP TSG RAN WG1 Meeting #99, 3GPP Draft, R1-1912223, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), 11 Pages, XP051823300, paragraph [3.BeamrecoveryonSCell], p. 3, line 1-line 31, section 2.2.
Intel Corporation: "On Beam Management Enhancement", 3GPP TSG RAN WG1 Meeting #96, 3GPP Draft, R1-1902503, 3rd Generation Partnership Project (3GPP), Mobile Competence Centre, 650, Route Des Lucioles, F-06921 Sophia-Antipolis Cedex, France, Athens, Greece, Feb. 25, 2019-Mar. 1, 2019, pp. 1-13, Mar. 1, 2019 (Mar. 1, 2019), XP051600199, Chapter 5 & 6, https://www.3gpp.org/ftp/tsg_ran/WG1_RL1/TSGR1_96/Docs/R1-1902503.zip.
Intel Corporation: "On Beam Management Enhancement", R1-1812507, 3GPP TSG RAN WG1 Meeting #95, Spokane, USA, Nov. 12-16, 2018, pp. 1-10, URL: https://www.3gpp.org/ftp/tsg_ran/wg1_rl1/TSGR1_95/Docs/.
Intel Corporation: "Summary 2 on SCell BFR and Beam Measurement", 3GPP TSG RAN WG1 Meeting #95, R1- 1814145, Spokane, USA, Nov. 12-16, 2018, 18 Pages.
Intel Corporation: "Summary on SCell BFR and Beam Measurement", 3GPP TSG RAN WG1 Meeting #95, R1-1813978, Spokane, USA, Nov. 12-16, 2018, 18 Pages.
Interdigital, Inc.: "On Multi-Beam Operation Enhancements", R1-1813240, 3GPP TSG RAN WG1 Meeting #95, Spokane, USA, Nov. 12-16, 2018, 4 Pages, URL: https://www.3gpp.org/ftp/tsg_ran/wg1_rl1/TSGR1_95/Docs/.
International Preliminary Report on Patentability—PCT/US2019/068744, The International Bureau of WIPO—Geneva, Switzerland, dated Jul. 15, 2021.
International Search Report and Written Opinion—PCT/US2019/068744—ISA/EPO—dated Apr. 7, 2020.

Itri: "Discussion on Enhancements on Multi-Beam Operation", R1-1813344, 3GPP TSG RAN WG1 Meeting #95, Spokane, USA, Nov. 12-16, 2018, 2 Pages, URL: https://www.3gpp.org/ftp/tsg_ran/wg1_rl1/TSGR1_95/Docs/.
Lenovo, et al., "Discussion of Multi-Beam Operation", 3GPP TSG RAN WG1 Meeting #95, R1-1812785, Spokane, USA, Nov. 12-16, 2018, 5 Pages, https://www.3gpp.org/ftp/TSG_RAN/WG1_RL1/TSGR1_95/Docs/R1-1812785.zip.
LG Electronics: "Updated Feature Lead Summary of Enhancements on Multi-Beam Operations", 3GPP TSG RAN WG1 Meeting #95, R1-1814122, Spokane, USA, Nov. 12-16, 2018, pp. 1-26.
LG Electronics: "Discussion on Multi-Beam Based Operations and Enhancements", 3GPP TSG RAN WG1 Meeting #96, R1-1902092, Athens, Greece, Feb. 25-Mar. 1, 2019, pp. 1-12, https://www.3gpp.org/ftp/tsg_ran/WG1_RL1/TSGR1_96/Docs/R1-1902092.zip.
LG Electronics: "Discussion on Multi-Beam Based Operations and Enhancements", R1-1812582, 3GPP TSG RAN WG1 Meeting #95, Spokane, USA, Nov. 12-16, 2018, pp. 1-10.
LG Electronics: "Feature Lead Summary of Enhancements on Multi-Beam Operations", 3GPP TSG RAN WG1 Meeting #95, R1-1813944, Spokane, USA, Nov. 12-16, 2018, pp. 1-25.
MCC Support: "Final Report of 3GPP TSG RAN WG1 #95 v1.0.0 (Spokane, USA, Nov. 12-16, 2018)", R1-1901482, 3GPP TSG RAN WG1 Meeting #96, Athens, Greece, Feb. 25-Mar. 1, 2019, pp. 1-172.
Mediatek Inc: "Enhancements on Multi-Beam Operations", 3GPP Draft, 3GPP TSG RAN WG1 #99, R1-1912135, 3rd Generation Partnership Project (3GPP), Mobile Competence Centre, 650, Route Des Lucioles, F-06921, Sophia-Antipolis, Cedex, France, vol. RAN WG1, No. Reno, USA, Nov. 18, 2019-Nov. 22, 2019, 10 Pages, Nov. 9, 2019 (Nov. 9, 2019), XP051823216, section 4, p. 6-p. 7, figure 2, chapter 2.2.1.
Mediatek Inc.: "Enhancements on Multi-Beam Operations", R1-1812350, 3GPP TSG RAN WG1 Meeting #95, Spokane, US, Nov. 12-16, 2018, 9 Pages, URL: https://www.3gpp.org/ftp/tsg_ran/wg1_rl1/TSGR1_95/Docs/.
Mitsubishi Electric: "Views on Multi-Beam Operation", R1-1813384, 3GPP TSG RAN WG1 Meeting #95, Spokane, USA, Nov. 12-16, 2018, 6 Pages, URL: https://www.3gpp.org/ftp/tsg_ran/wg1_rl1/TSGR1_95/Docs/.
NEC: "Discussion on Beam Failure Recovery", 3GPP Draft, 3GPP TSG RAN WG1 Meeting #95, R1-1812646, Discussion on Beam Failure Recovery, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018 (Nov. 11, 2018), XP051554602, 2 pages, Sections 2-3.
Nokia, et al., "Enhancements on Multi-Beam Operation", 3GPP TSG RAN WG1 Meeting #95, R1-1813490, Spokane, USA, Nov. 12-16, 2018, Nov. 16, 2018 (Nov. 16, 2018) Sections 1-3, 15 Pages.
Nokia, et al., "Enhancements on Multi-Beam Operation", 3GPP TSG RAN WG1 Meeting #96, R1-1902564, Athens, Greece, Feb. 25-Mar. 1, 2019, 22 Pages, https://www.3gpp.org/ftp/tsg_ran/WG1_RL1/TSGR1_96/Docs/R1-1902564.zip.
NTT Docomo Inc: "Discussion on Multi-Beam Enhancement", 3GPP TSG RAN WG1 Meeting #95, R1-1813334, Spokane, USA, Nov. 12-16, 2018, pp. 1-14, https://www.3gpp.org/ftp/tsg_ran/WG1_RL1/TSGR1_95/Docs/R1-1813334.zip.
NTT Docomo Inc, et al., "Discussion on Multi-Beam Enhancement", 3GPP Draft, 3GPP TSG RAN WG1 #96, R1-1902813, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, 22 Pages, Feb. 15, 2019 (Feb. 15, 2019), XP051600508, paragraph [0002]-paragraph [02.4].
Oppo: "Discussion on Multi-Beam Operation Enhancements", 3GPP Draft, 3GPP TSG RAN WG1 #96, R1-1902704, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600399, 9 Pages, Sections 1.-3.

(56) References Cited

OTHER PUBLICATIONS

Oppo: "Discussion on Multi-Beam Operation Enhancements", R1-1812837, 3GPP TSG-RAN WG1 Meeting #95, Spokane, USA, Nov. 12-16, 2018, 7 Pages, URL: https://www.3gpp.org/ftp/tsg_ran/wg1_rl1/TSGR1_95/Docs/.

Panasonic: "Enhancements on Multi-Beam Operations", R1-1912084, 3GPP TSG RAN WG1 #99, Reno, Nevada, US, Nov. 18-22, 2019, 2 Pages, https://www.3gpp.org/ftp/tsg_ran/WG1_RL1/TSGR1_99/Docs/R1-1912084.zip.

Qualcomm Incorporated: "Enhancements on Multi-Beam Operation", 3GPP Draft, 3GPP TSG-RAN WG1 Meeting #95, R1-1813443, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1. No. Spokane, Washington, USA, Nov. 12, 2018-Nov. 16, 2018, Nov. 11, 2018 (Nov. 11, 2018), XP051555482, 22 Pages.

Qualcomm Incorporated: "Enhancements on Multi-Beam Operation", 3GPP Draft, R1-1912968, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno, Nevada, US, Nov. 18, 2019-Nov. 22, 2019, Nov. 9, 2019 (Nov. 9, 2019), XP051823730, pp. 1-20, sections 2.1, 2.2, 2.3, 2.5, 7.4.

Samsung: "Enhancements on Multi-Beam Operations", 3GPP TSG RAN WG1 96, R1-1902306, Athens, Greece, Feb. 25-Mar. 1, 2019, 9 Pages, https://www.3gpp.org/ftp/tsg_ran/WG1_RL1/TSGR1_96/Docs/R1-1902306.zip.

Samsung: "Enhancements on Multi-Beam Operations", 3GPP TSG RAN WG1 99, R1-1912483, Reno, USA, Nov. 18-22, 2019, 6 Pages, https://www.3gpp.org/ftp/tsg_ran/WG1_RL1/TSGR1_99/Docs/R1-1912483.zip.

Samsung: "Enhancements on Multi-Beam Operations", R1-1813998, 3GPP TSG RAN WG1 Meeting #95, Spokane, USA, Nov. 12-16, 2018, 8 Pages, URL: https://www.3gpp.org/ftp/tsg_ran/wg1_rl1/TSGR1_95/Docs/.

Sony: "Considerations on Multi-Beam Operation", R1-1812748, 3GPP TSG-RAN WG1 #95, Spokane, USA, Nov. 12-16, 2018, 8 Pages, URL: https://www.3gpp.org/ftp/tsg_ran/wg1_rl1/TSGR1_95/Docs/.

Spreadtrum Communications: "Discussion on Multi-Beam Operation", 3GPP TSG RAN WG1 #99, R1-1912563, Reno, USA, Nov. 18-22, 2019, 6 Pages, https://www.3gpp.org/ftp/tsg_ran/WG1_RL1/TSGR1_99/Docs/R1-1912563.zip.

Spreadtrum Communications: "Discussion on Multi-Beam Operation", 3GPP TSG RAN WG1 Meeting #95, R1-1813067, Spokane, USA, Nov. 12-16, 2018, 5 Pages, https://www.3gpp.org/ftp/tsg_ran/WG1_RL1/TSGR1_95/Docs/R1-1813067.zip.

Vivo: "Discussion on Enhancements on Multi-Beam Operation", 3GPP TSG RAN WG1 Meeting #95, R1-1812324, Spokane, USA, Nov. 12-16, 2018, 10 Pages, https://www.3gpp.org/ftp/tsg_ran/WG1_RL1/TSGR1_95/Docs/R1-1812324.zip.

Vivo: "Discussion on Scell BFR", 3GPP TSG RAN WG1 #94b, 3GPP Draft; R1-1810409 Discussion on Scell BFR, 3rd Generation Partnership Project (3GPP), Mobile Competence Centre; 650, Route Des Lucioles ; F-06921 Sophia-Antipolis Cedex ; France, vol. RAN WG1, No. Chengdu, China; Oct. 8, 2018-Oct. 12, 2018, Sep. 29, 2018 (Sep. 29, 2018), XP051517818, 4 Pages, p. 1.

Vivo: "Remaining Issues on Multi-Beam Transmission", 3GPP Draft, 3GPP TSG-RAN WG1 #99, R1-1912040, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 8, 2019 (Nov. 8, 2019), XP051819923, 10 pages, p. 7.

Xiaomi: "Enhancements on Beam Management", R1-1813340, 3GPP TSG RAN WG1 Meeting #95, Spokane, USA, Nov. 12-16, 2018, 4 Pages, URL: https://www.3gpp.org/ftp/tsg_ran/wg1_rl1/TSGR1_95/Docs/.

ZTE: "Enhancements on Multi-Beam Operation", R1-1812257, 3GPP TSG RAN WG1 Meeting #95, Spokane, USA, Nov. 12-16, 2018, 11 Pages, URL: https://www.3gpp.org/ftp/tsg_ran/wg1_rl1/TSGR1_95/Docs/.

ZTE: "Enhancements on Multi-Beam Operation", R1-1911931, 3GPP TSG RAN WG1 Meeting #99, 3rd Generation Partnership Project, Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 9, 2019, XP051823112, 18 Pages.

CATT: "Discussion on Enhancements on MIMO for NR", 3GPP TSG RAN Meeting #82, RP-182349, Sorrento, Italy, Dec. 10-13, 2018, 2 Pages.

\* cited by examiner

RECOVERY MECHANISM FOR SECONDARY CELL

CROSS-REFERENCE TO RELATED APPLICATIONS

This application is a continuation of U.S. patent application Ser. No. 17/327,094, filed May 21, 2021, which is a continuation of U.S. patent application Ser. No. 16/727,678, filed Dec. 26, 2019, which claims benefit of U.S. Provisional Patent Application Ser. No. 62/787,937, filed Jan. 3, 2019, which are expressly incorporated herein by reference in their entireties.

INTRODUCTION

Aspects of the present disclosure relate to wireless communications, and more particularly, to cell recovery techniques.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by method for wireless communication. The method generally includes receiving, at a user-equipment (UE), at least one pilot signal via a secondary cell, receive, via a primary cell, a first message triggering reporting of at least one preferred beam for communication via the secondary cell, determining the preferred beam based on the at least one pilot signal, transmitting, via the primary cell, a report indicating the at least one preferred beam, and receiving data via the secondary cell and via the preferred beam.

Certain aspects provide a method for wireless communication by method for wireless communication. The method generally includes transmitting, via a primary cell, a first message triggering reporting by a UE of at least one preferred beam for communication via a secondary cell, receiving, from the UE via the primary cell, a report indicating the at least one preferred beam, and configuring a transmission configuration state in accordance with the preferred beam for data transmission via the secondary cell to the UE.

Certain aspects provide an apparatus for wireless communication. The apparatus generally includes a transceiver configured to receive, at a UE, at least one pilot signal via a secondary cell, and receive, via a primary cell, a first message triggering reporting of at least one preferred beam for communication via the secondary cell, and a processor coupled to the transceiver and configured to determine the preferred beam based on the at least one pilot signal, wherein the transceiver is further configured to transmit, via the primary cell, a report indicating the at least one preferred beam, and communicate data via the secondary cell and via the preferred beam.

Certain aspects provide an apparatus for wireless communication. The apparatus generally includes a transceiver configured to transmit, via a primary cell, a first message triggering reporting by a UE of at least one preferred beam for communication via a secondary cell, and receive, from the UE via the primary cell, a report indicating the at least one preferred beam, and a processor coupled to the transceiver and configured to configure a transmission configuration state in accordance with the preferred beam for communication via the secondary cell with the UE.

Certain aspects provide an apparatus for wireless communication. The apparatus generally includes means for receiving, at a UE, at least one pilot signal via a secondary cell, means for receiving, via a primary cell, a first message triggering reporting of at least one preferred beam for communication via the secondary cell, means for determining the preferred beam based on the at least one pilot signal, means for transmitting, via the primary cell, a report indicating the at least one preferred beam, and means for communicating data via the secondary cell and via the preferred beam.

Certain aspects provide an apparatus for wireless communication. The apparatus generally includes means for transmitting, via a primary cell, a first message triggering reporting by a UE of at least one preferred beam for communication via a secondary cell, means for receiving, from the UE via the primary cell, a report indicating the at least one preferred beam, and means for configuring a transmission configuration state in accordance with the preferred beam for communication via the secondary cell with the UE.

Certain aspects are directed to a computer-readable medium having instructions stored thereon to cause an apparatus to receive, at a UE, at least one pilot signal via a secondary cell, receive, via a primary cell, a first message triggering reporting of at least one preferred beam for communication via the secondary cell, determine the preferred beam based on the at least one pilot signal; transmit, via the primary cell, a report indicating the at least one preferred beam, and communicating data via the secondary cell and via the preferred beam.

Certain aspects are directed to a computer-readable medium having instructions stored thereon to cause an apparatus to transmit, via a primary cell, a first message triggering reporting by a UE of at least one preferred beam for communication via a secondary cell, receive, from the UE via the primary cell, a report indicating the at least one preferred beam, and configure a transmission configuration state in accordance with the preferred beam for communication via the secondary cell with the UE.

Certain aspects provide a method for wireless communication at a base station. The method generally includes receiving, on a first cell, an indication that one or more channel measurements are to be reported for a second cell for which beam failure is detected; transmitting a first message triggering reporting of at least one preferred beam for communicating on the second cell, the first cell being different from the second cell, wherein the first message is transmitted in response to the indication that the one or more channel measurements are to be reported; receiving a report indicating the at least one preferred beam; and configuring a transmission configuration state in accordance with the at least one preferred beam for communicating on the second cell.

Certain aspects provide an apparatus for wireless communication. The apparatus generally includes a memory and one or more processors coupled to the memory. The one or more processors are configured to receive, on a first cell, an indication that one or more channel measurements are to be reported for a second cell for which beam failure is detected; transmit a first message triggering reporting of at least one preferred beam for communicating on the second cell, the first cell being different from the second cell, wherein the first message is transmitted in response to the indication that the one or more channel measurements are to be reported; receive a report indicating the at least one preferred beam; and configure a transmission configuration state in accordance with the at least one preferred beam for communicating on the second cell.

Certain aspects provide an apparatus for wireless communication. The apparatus generally includes means for receiving, on a first cell, an indication that one or more channel measurements are to be reported for a second cell for which beam failure is detected; means for transmitting a first message triggering reporting of at least one preferred beam for communicating on the second cell, the first cell being different from the second cell, wherein the first message is transmitted in response to the indication that the one or more channel measurements are to be reported; means for receiving a report indicating the at least one preferred beam; and means for configuring a transmission configuration state in accordance with the at least one preferred beam for communicating on the second cell.

Certain aspects are directed to a non-transitory computer-readable medium comprising executable instructions that, when executed by one or more processors of an apparatus, cause the apparatus to receive, on a first cell, an indication that one or more channel measurements are to be reported for a second cell for which beam failure is detected; transmit a first message triggering reporting of at least one preferred beam for communicating on the second cell, the first cell being different from the second cell, wherein the first message is transmitted in response to the indication that the one or more channel measurements are to be reported; receive a report indicating the at least one preferred beam; and configure a transmission configuration state in accordance with the at least one preferred beam for communicating on the second cell.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
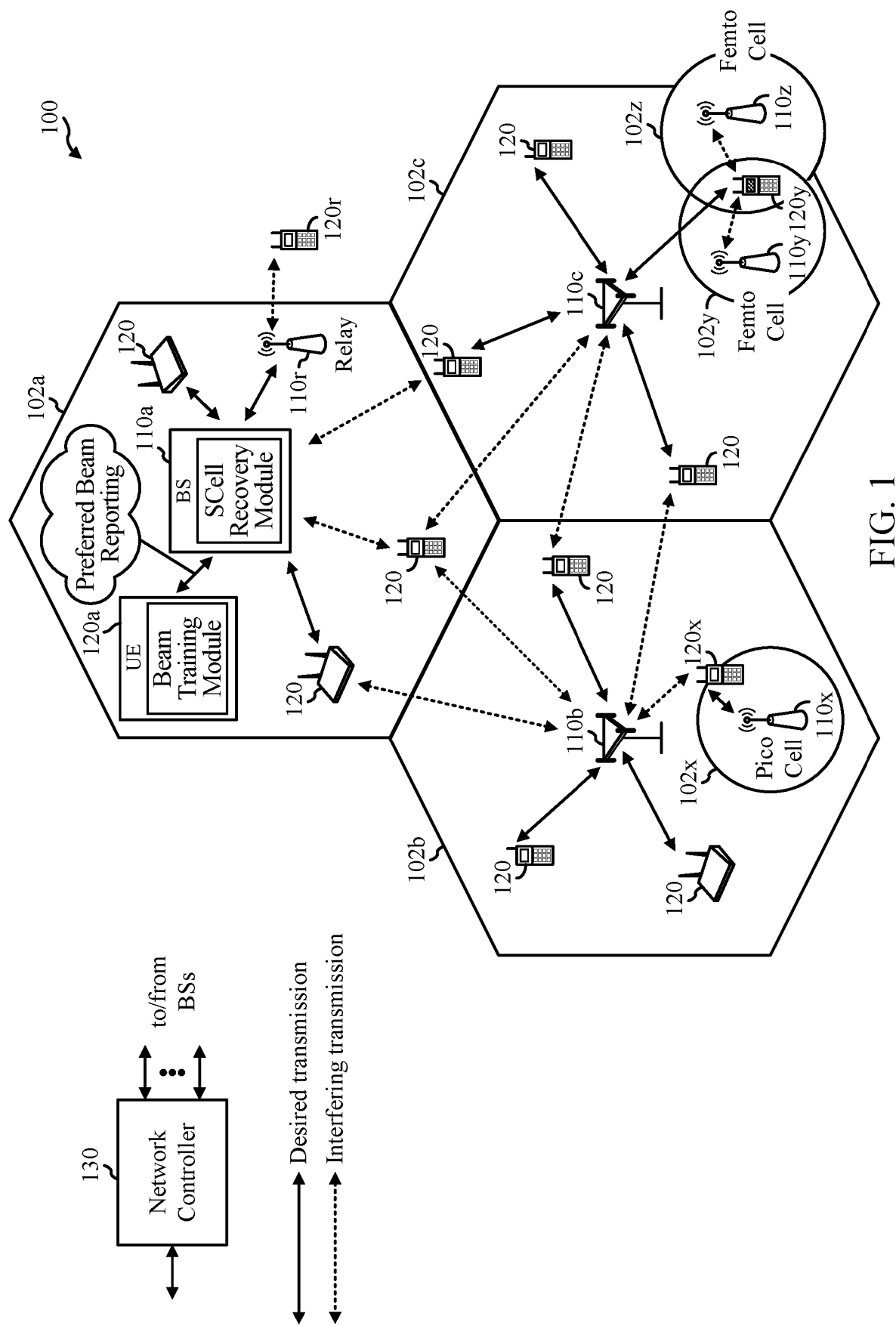
FIG. 1 is a block diagram conceptually illustrating an example telecommunications system, in accordance with certain aspects of the present disclosure.

Aspects of the present disclosure provide apparatus, methods, processing systems, and computer readable mediums for secondary cell recovery via a primary cell. For example, the secondary cell may be configured for only downlink (DL) transmissions to a user-equipment (UE). Thus, upon beam failure, cell recovery may be performed via a primary cell. For instance, the UE may monitor failure detection resources to detect beam failure of the secondary cell, and upon detection, send an indication to a base station via the primary cell. The primary cell may then configure beamforming operations for the secondary cell. For example, the base station may request, from the UE, reporting of a preferred beam for communication via the secondary cell. The UE may transmit the report indicating the preferred beam to the base station via the primary cell, followed by activation and reconfiguration of the secondary cell for DL communication to the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, a user equipment (UE), such as the UE 120 in the wireless communication network 100 communicates with a serving base station (BS), such as the BS 110a in a cell 102a in the wireless communication network 100. The UE 120 may be configured with multiple transmission configurations (e.g., antenna arrays/panels and/or beams) for uplink transmission to the BS 110a. In certain aspects, the BS 110a may configure downlink (DL) transmission to the UE 120 via a secondary cell. For example, the secondary cell may be configured for only downlink (DL) transmissions to a user-equipment (UE). Thus, upon beam failure, cell recovery may be performed via a primary cell using the SCell recovery module. For instance, the UE may monitor failure detection resources to detect beam failure of the secondary cell, and upon detection, send an indication to the base station via the primary cell. The primary cell may then configure beamforming operations for the secondary cell. For example, the base station may request reporting of a preferred beam for communication via the primary cell. The determine a preferred beam for communication via the secondary cell via the Beam training module, as illustrated in FIG. 1. The UE may transmit the report indicating the preferred beam to the base station via the primary cell, followed by activation and reconfiguration of the secondary cell for DL communication to the UE.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
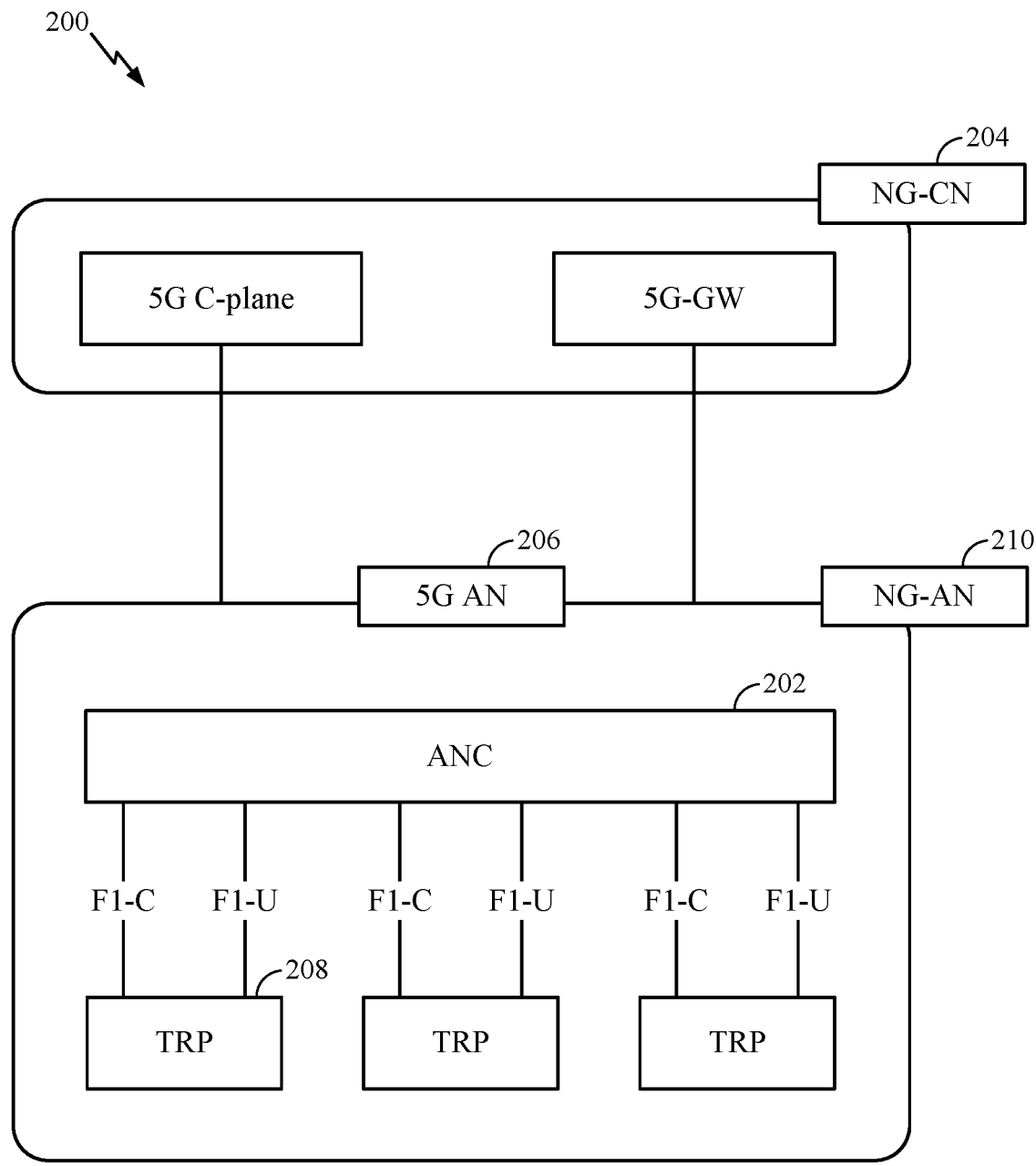
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
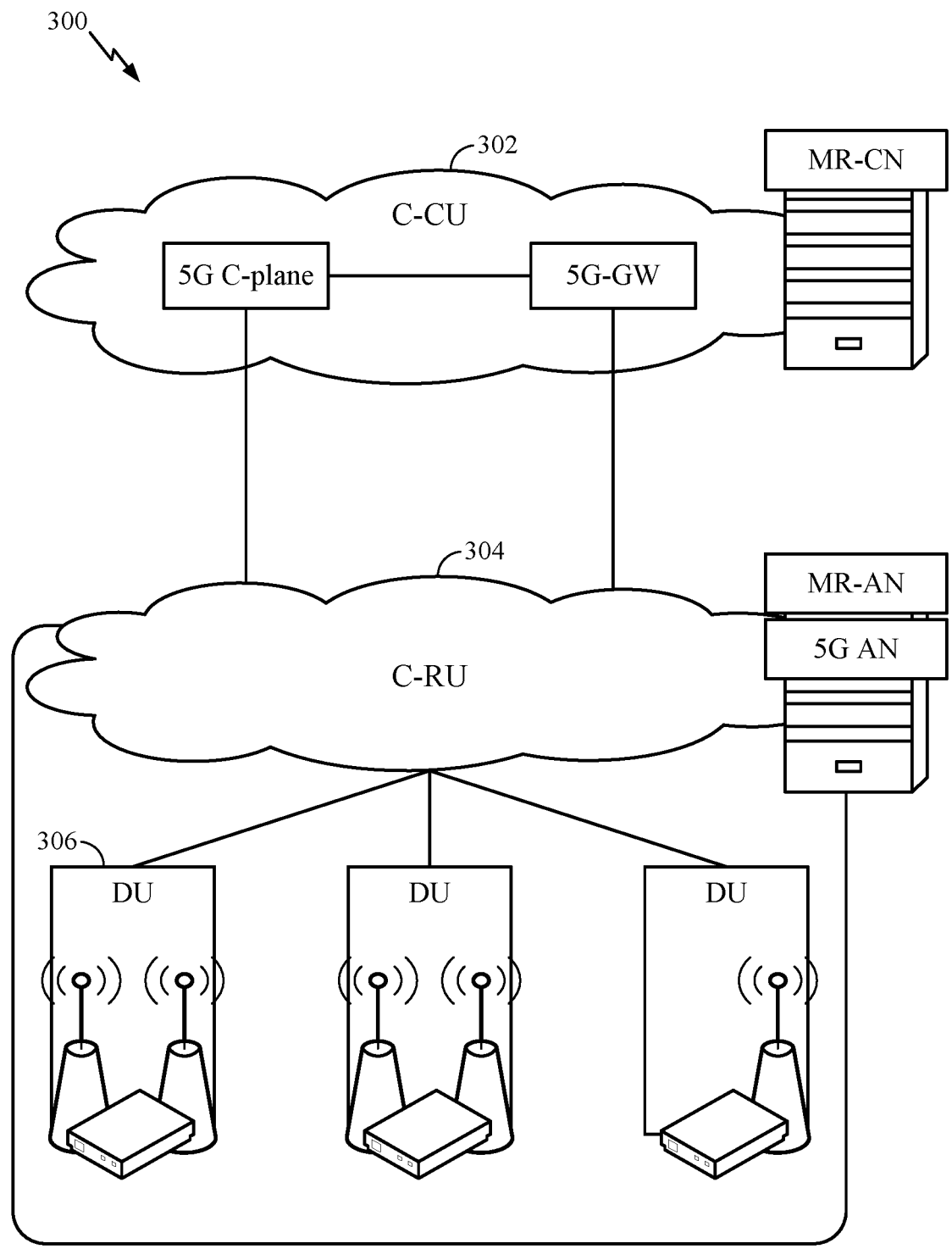
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
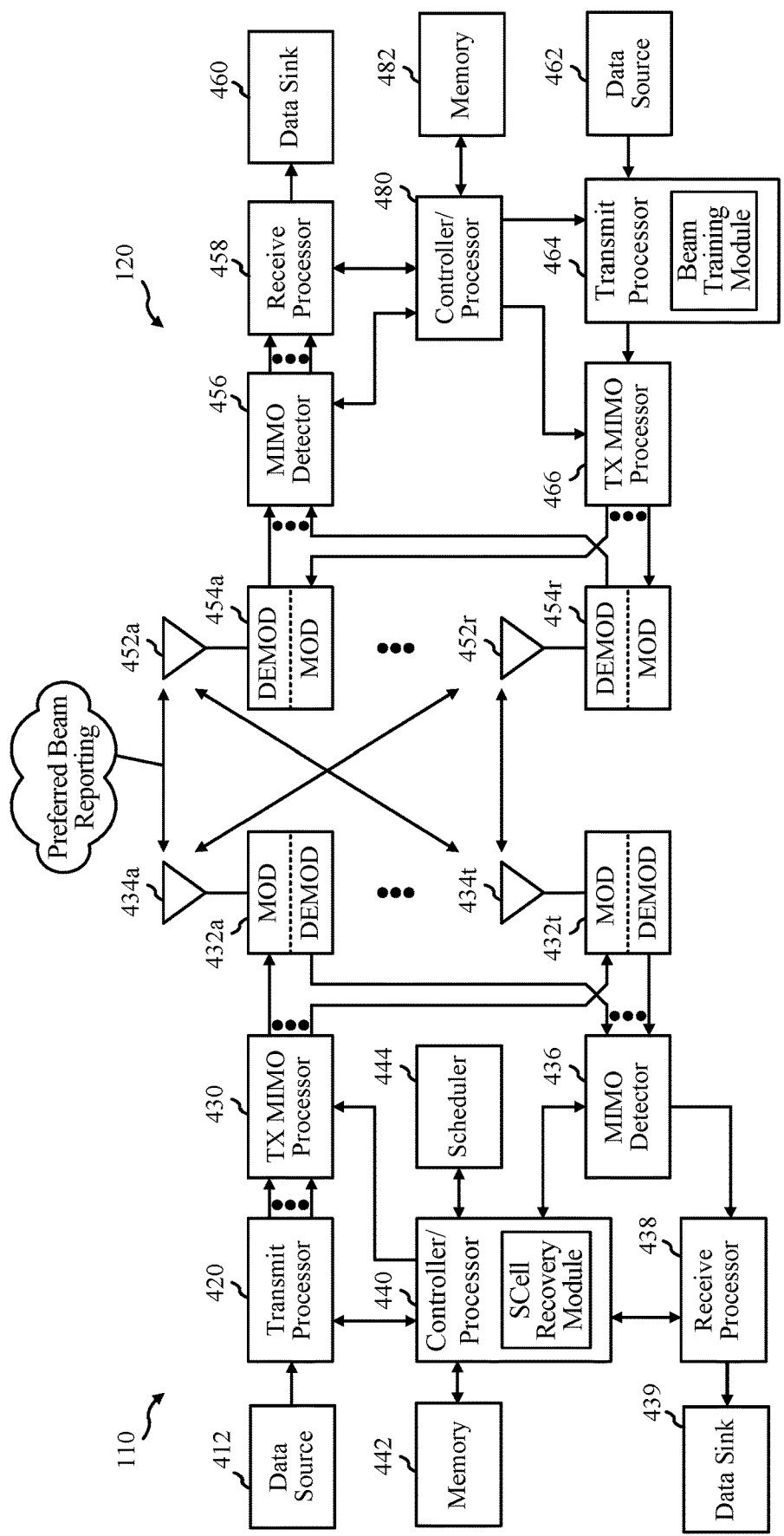
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. As shown in FIG. 4, the transmit processor 464 has a beam training module that may perform cell recovery of a secondary cell via a primary cell. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. For example, as shown in FIG. 4, the processor 440 has a secondary cell recovery module that may assist in recovery of a secondary cell for DL communication to the UE, as described in more detail herein. The memories 442 and 482 may store data and program codes for BS 110 and UE 120, respectively. A scheduler 444 may schedule UEs for data transmission on the downlink and/or uplink.

Figure 5:
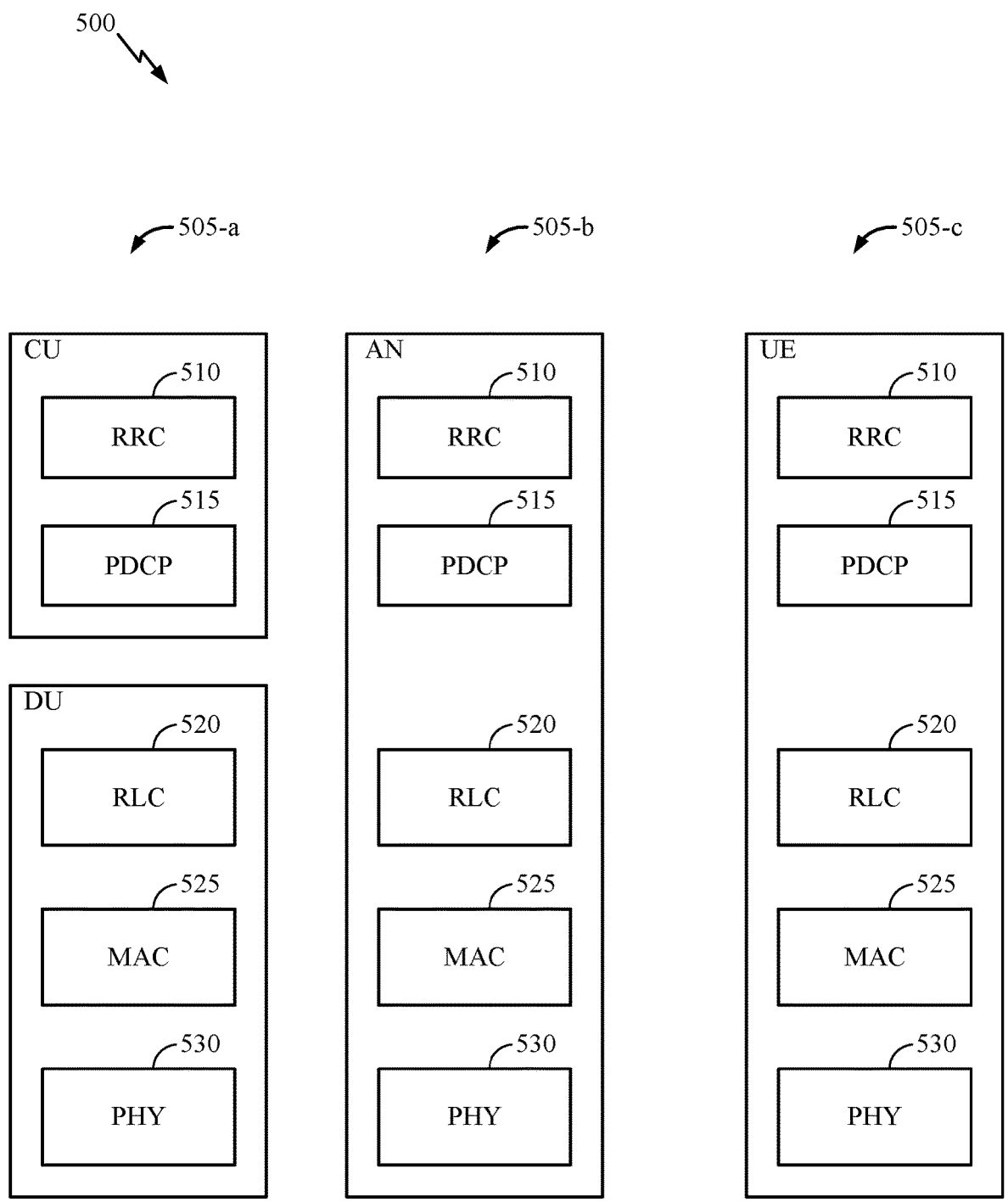
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
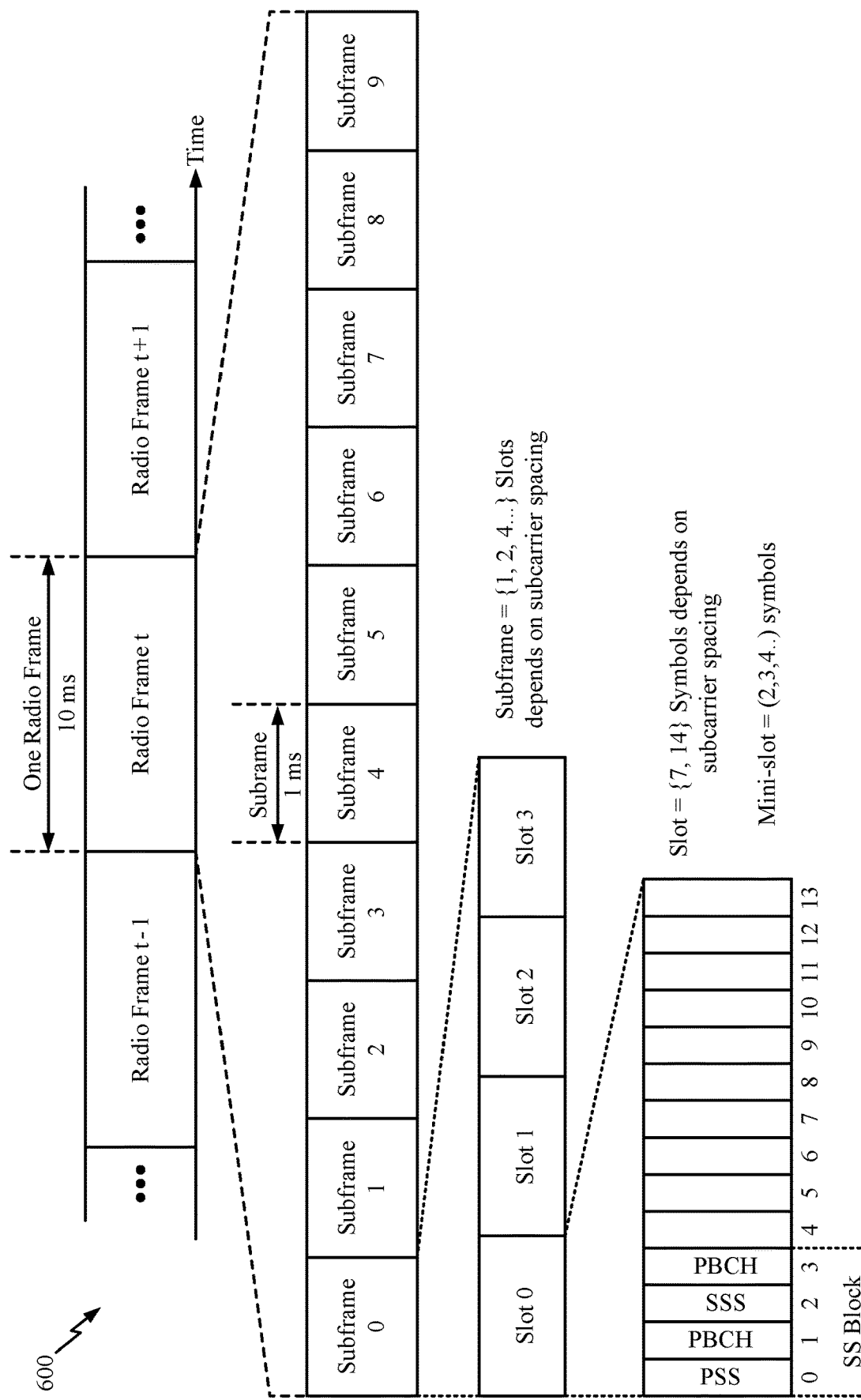
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within a radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Recovery Mechanism for Secondary Cell (SCell)

In certain systems, such as for fifth generation (5G) wireless technologies, a primary cell (PCell) (e.g., frequency range 1 (FR1)) and a secondary-cell (SCell) may be used for communication with a user-equipment (UE). In some cases, such as a scenario with downlink (DL)-intensive traffic, the SCell may have only the forward link (DL). Certain aspects of the present disclosure are also applicable to an SCell (frequency range 2 (FR2)) with a beam correspondence assumption. For example, the aspects described herein may be used for beam reciprocity where a receive beam used for DL may be assumed to be the same as a beam for uplink (UL). Thus, upon determination of a preferred DL beam, the DL beam may also be used for UL communication.

To reduce latency, a DL beam may be active prior to link usage. Thus, a beam failure recovery procedure may be defined to monitor the DL beams at the UE and enable transmission configuration indicator (TCI)-reconfiguration at the base station (BS) (e.g., gNB) side upon detection of beam failure. For example, a BS may trigger channel measurements (e.g., via CSI-RS) for the SCell.

The channel measurements may be triggered when the BS has to schedule SCell DL, or upon beam failure. The UE then reports top n beam indices and reference signal receive powers (RSRPs) via the PCell, n being an integer equal to or greater than 1. For example, the UE may report the beam indices via a medium access control (MAC)-control element (CE), or physical uplink control channel (PUCCH). Based on the UE report, the BS may determine a beam for the communication via the secondary cell.

Figure 7:
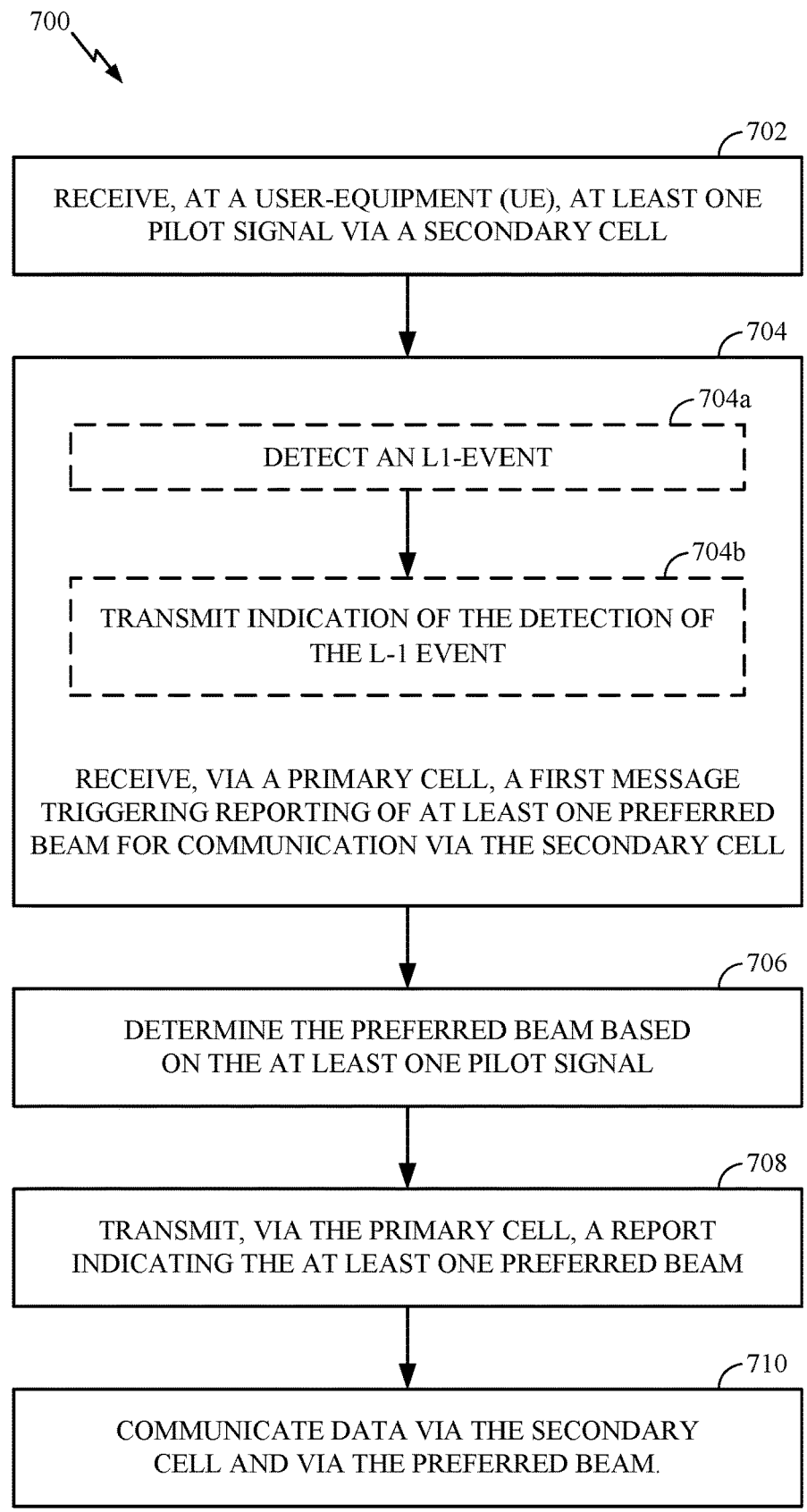
FIG. 7 is a flow diagram illustrating example operations by a UE for wireless communication, in accordance with certain aspects of the present disclosure.

FIG. 7 is a flow diagram illustrating example operations 700 for wireless communication, in accordance with certain aspects of the present disclosure. The operations 700 may be performed by a UE, such as the UE 120.

Operations 700 may be implemented as software components that are executed and run on one or more processors (e.g., controller/processor 480 of FIG. 4). Further, the transmission and reception of signals by the UE in operations 700 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 700 begin, at block 702, by receiving, at the UE, at least one pilot signal via a secondary cell, and at block 704, receiving, via a primary cell, a first message triggering reporting of at least one preferred beam for communication via the secondary cell. For example, at block 704a, the UE may detect a layer 1 (e.g., physical (PHY) layer) L1-event. An L1 event generally refers to any event that suggests that a switch to a beam that is better than a currently active beam is warranted. For example, an L1 measurement may include a reference signal (RS) measurement that results in an L1 event indicating, for example, a degraded signal quality associated with the currently active beam. The L1 event may be reported to the L1 layer, and suggests that a switch to a better beam may be warranted. For instance, the UE may detect whether one or more channel measurements are to be performed for the secondary cell by detecting beam failure with respect to the secondary cell. At block 704b, the UE may transmit, via the primary cell, an indication of the detection of the L1-event. In this case, the first message triggering the reporting of the at least one preferred beam may be received after the transmission of the indication of the L1-event.

At block 706, the UE determines the preferred beam based on the at least one pilot signal, and at block 708, transmits, via the primary cell, a report indicating the at least one preferred beam. The first message triggering the reporting of the preferred beam may be received before the transmission of the indication to the primary cell. At block 710, data may be communicated via the secondary cell and the preferred beam. In certain aspects, determining the preferred beam comprises determining a beam of a plurality of beams received with the highest quality at the UE.

Figure 8:
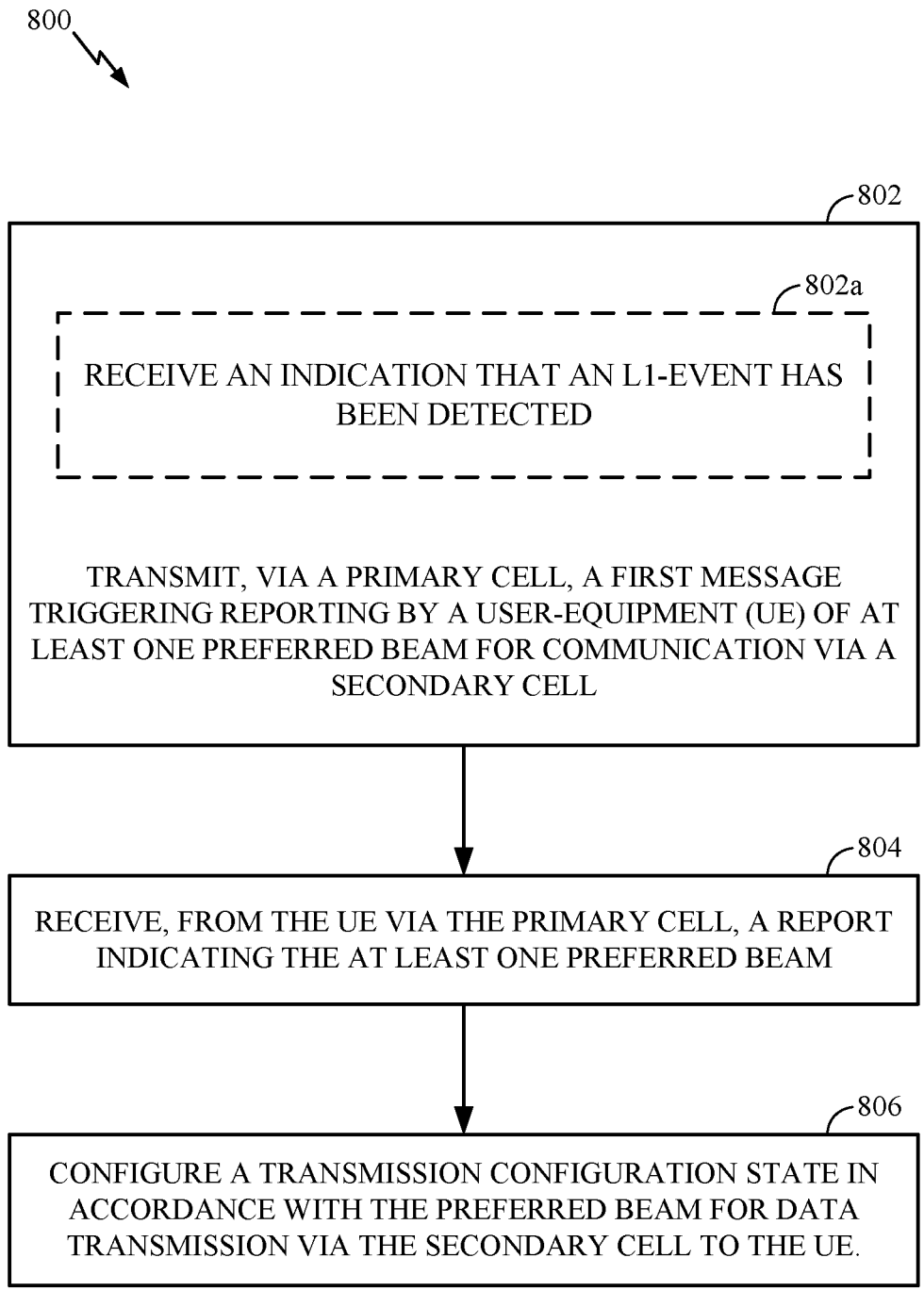
FIG. 8 is a flow diagram illustrating example operations by a BS for wireless communication, in accordance with certain aspects of the present disclosure.

FIG. 8 is a flow diagram illustrating example operations 800 for wireless communication, in accordance with certain aspects of the present disclosure. The operations 800 may be performed by a base station (e.g., gNB), such as the base station 110.

Operations 800 may be implemented as software components that are executed and run on one or more processors (e.g., controller/processor 440 of FIG. 4). Further, the transmission and reception of signals by the BS in operations 800 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 800 begin, at block 802, by transmitting, via a primary cell, a first message triggering reporting by a UE of at least one preferred beam for communication via a secondary cell, and at block 804, receiving, from the UE via the primary cell, a report indicating the at least one preferred beam. In certain aspects, the operations 800 may also include, at block 802a, receiving, from the UE via the primary cell, an indication that an L1-event has been detected (e.g., that one or more channel measurements are to be performed). In this case, the first message triggering the reporting of the preferred beam is transmitted in response to the reception of the indication of the L1-event. At block 806, the base station configures a transmission configuration state in accordance with the preferred beam for data communication via the secondary cell with the UE.

Figure 9:
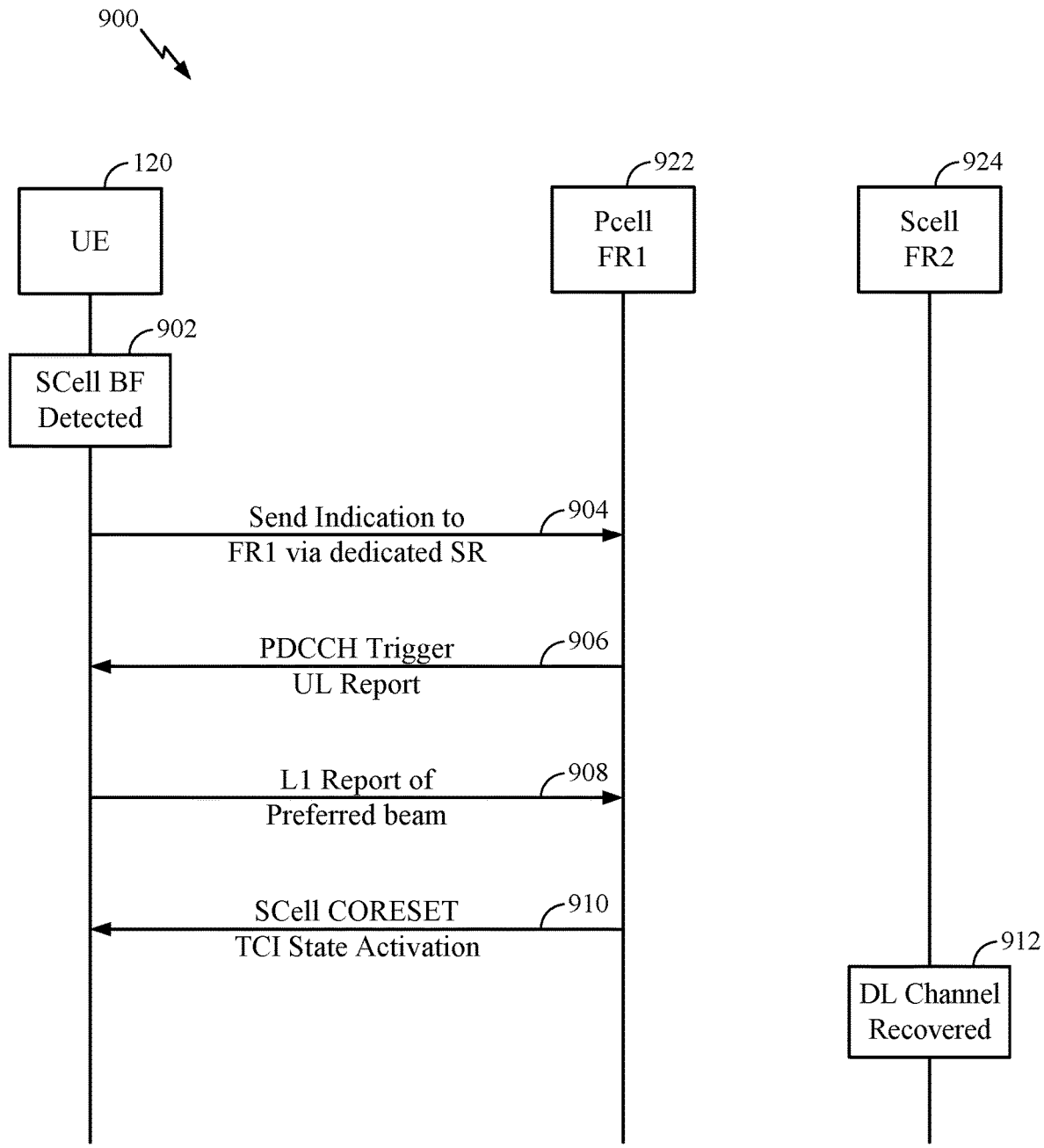
FIG. 9 is a timing diagram illustrating beam recovery operations, in accordance with aspects of the present disclosure.

FIG. 9 is a timing diagram illustrating example operations 900 for the secondary cell recovery, in accordance with certain aspects of the present disclosure. As illustrated, the UE 120 may leverage assistance of PCell 922 for DL beamforming for the SCell 924 and transmission configuration indicator (TCI) state activation. For example, at block 902, the UE 120 monitors failure detection resources configured by the BS for DL via the SCell 924 to detect beam failure. Upon detection of beam failure (or any L1 event), the UE 120 may send a message 904 (e.g., a beam failure recovery request (BFRQ)) indicating beam failure to the BS via the PCell 922. The BS may then request for an L1-report upon receiving the beam failure indication. For example, the BS may send a PDCCH trigger message 906 to the UE 120, as illustrated, requesting the L1 reporting. The UE 120 then sends the L1-report 908, indicating a preferred beam for communicating with the SCell 924. For example, the preferred beam may be selected based on pilot signals transmitted via the SCell 924. The pilot signals may be transmitted periodically via the SCell 924, or after the PDCCH trigger message is transmitted. The BS may then send a message 910 to the UE 120 confirming activation/reconfiguration of the SCell TCI state. At block 912, the DL channel for the SCell 924 is recovered, allowing for DL data communication to the UE via the SCell 924.

Certain aspects of the present disclosure provide techniques for distinguishing the PDCCH trigger, and candidate beam request and activation confirmation messages. For example, a unique sequence may be used to scramble the PDCCH trigger message 906 that requests the SCell 924 candidate beams from the UE 120. Thus, the sequence that the UE 120 uses to decode the PDCCH trigger message 906 indicates to the UE 120 that the PDCCH is triggering the reporting of an L1 report, indicating a preferred beam for the SCell. In certain aspects, the UE may monitor for the PDCCH trigger message 906 during a preset time window. In certain aspects, a search space in which the PDCCH trigger message 906 is encoded by the BS and decoded by the UE 120, indicates to the UE that the PDCCH is triggering the reporting of an L1 report.

In certain aspects, one or more bits in downlink control information (DCI) of the PDCCH trigger message 906 may indicate that the PDCCH trigger message 906 is requesting the reporting of the preferred beam for the SCell. After transmitting the PDCCH trigger message 906, the BS waits to receive the SCell L1-report from the UE via the PCell.

In certain aspects, the message 910 confirming the activation of the new TCI state may be sent via a PCell PDCCH addressed to a cell-radio network temporary identifier (C-RNTI) scrambled with an identifier of the SCell 924 (or any preset sequence associated with the SCell). In certain aspects, the UE 120 may monitor for the message 910 during a preset time window starting from reception of the message 906. In some cases, a beam recovery control resource set (CORSET) (e.g., a unique or distinct CORSET) may be assigned for the PCell 922 for the communication of message 910. The message 910 may be a MAC-CE having a unique MAC-CE format in the PCell 922 to indicate that the confirmation of TCI state activation is for the SCell 924.

Figure 10:
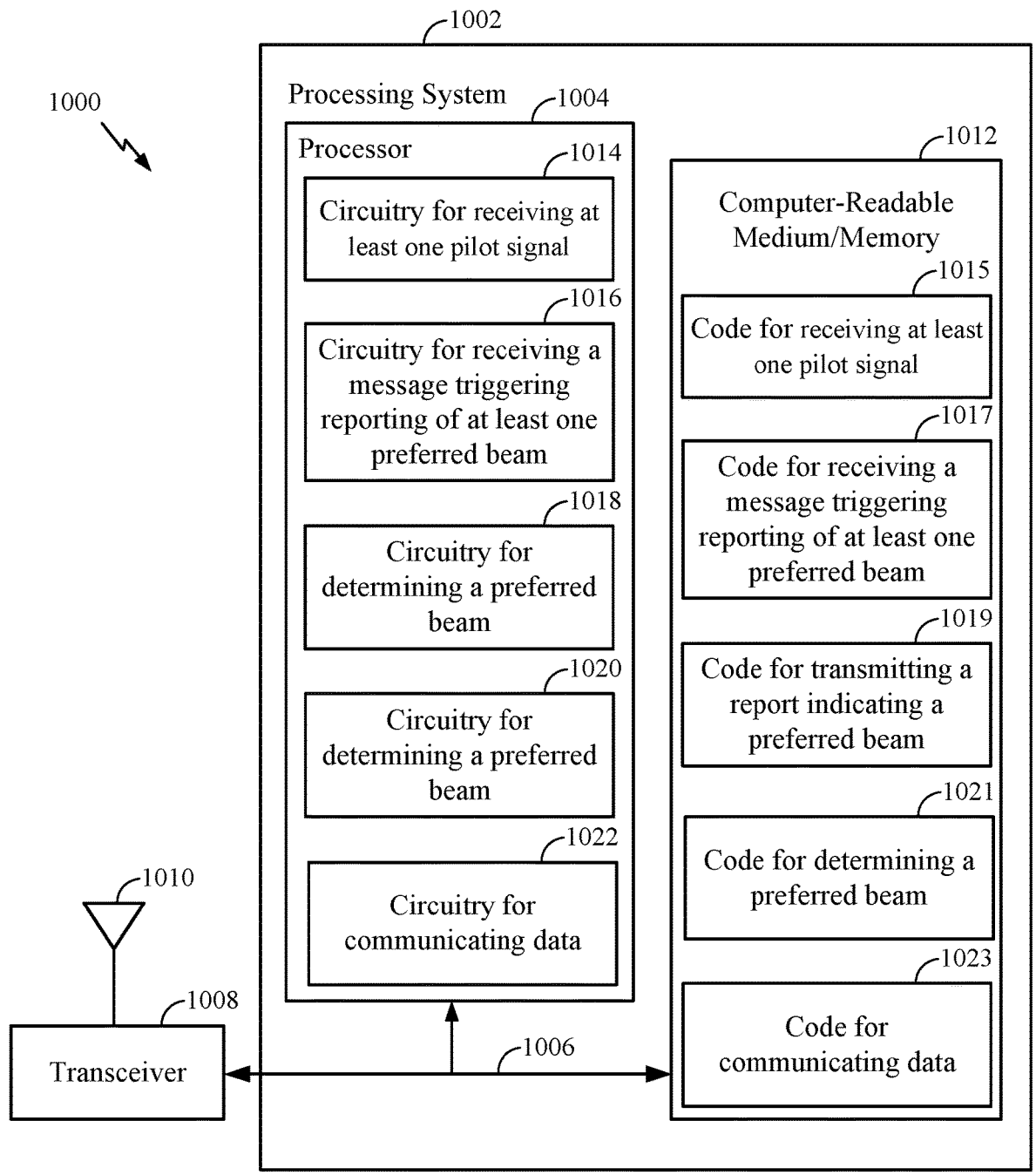
FIGS. 10 and 11 illustrate communications devices that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein, for example, for transmitting uplink transmissions with different transmission configuration. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for beam recovery. In certain aspects, computer-readable medium/memory 1012 stores code 1015 for receiving at least one pilot signal, code 1017 for receiving a message triggering reporting of at least one preferred beam, code 1019 for determining a preferred beam, code 1021 for transmitting a report indicating at least one preferred beam, and code 1023 for communicating data. In certain aspects, the processor 1004 has circuitry configured to implement the code stored in the computer-readable medium/memory 1012. The processor 1004 includes circuitry 1014 for receiving at least one pilot signal, circuitry 1016 for receiving a message triggering reporting of at least one preferred beam, circuitry 1018 for determining a preferred beam, circuitry 1020 for transmitting a report indicating at least one preferred beam, and circuitry 1022 for communicating data.

Figure 11:
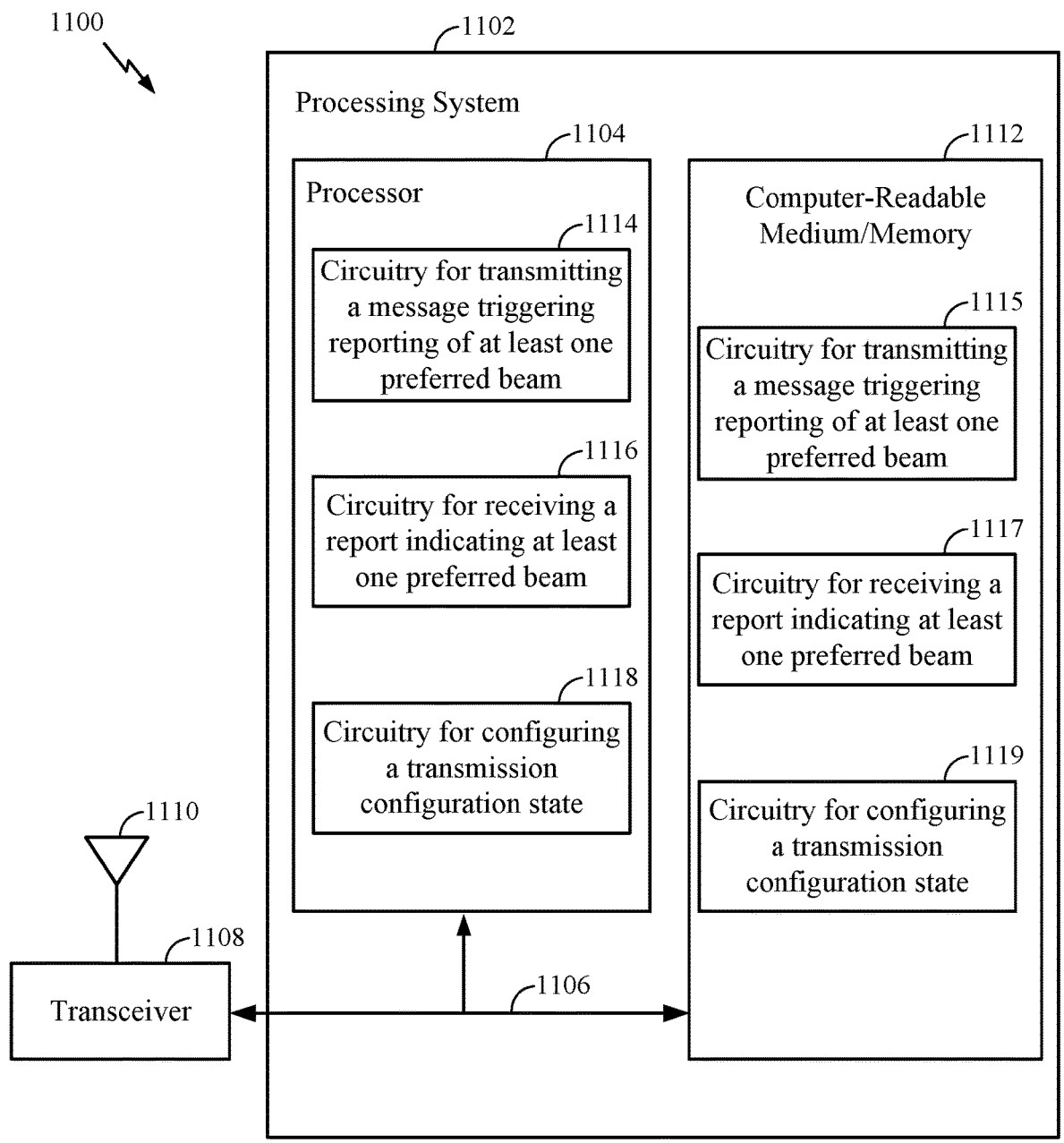

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein, for example, receiving uplink transmissions. The processing system 1102 may be configured to perform processing functions for the communications device 1100, including processing signals received and/or to be transmitted by the communications device 1100, such as interference control for uplink transmissions.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for interference control for uplink transmission. In certain aspects, computer-readable medium/memory 1112 stores code 1114 for transmitting a message triggering reporting of at least one preferred beam, code 1116 for receiving a report indicating the at least one preferred beam, and code 1118 for configuring a transmission configuration state. In certain aspects, the processor 1104 has circuitry configured to implement the code stored in the computer-readable medium/memory 1112. The processor 1104 includes circuitry 1115 for transmitting a message triggering reporting of at least one preferred beam, circuitry 1117 for receiving a report indicating the at least one preferred beam, and circuitry 1119 for configuring a transmission configuration state.

Example Aspects

In a first aspect, a method for wireless communication includes receiving, at a user-equipment (UE), at least one pilot signal via a secondary cell, receiving, via a primary cell, a first message triggering reporting of at least one preferred beam for communication via the secondary cell, determining the preferred beam based on the at least one pilot signal, transmitting, via the primary cell, a report indicating the at least one preferred beam, and communicating data via the secondary cell and via the preferred beam.

In a second aspect, in combination with the first aspect, the at least one pilot signal is associated with a plurality of beams, and the preferred beam corresponds to one of the plurality of beams received with highest quality at the UE.

In a third aspect, in combination with one or more of the first aspect and the second aspect, the method may also include detecting whether one or more channel measurements are to be performed for the secondary cell, and transmitting, via the primary cell, an indication that the one or more channel measurements are to be performed based on the detection, wherein the first message triggering the reporting of the preferred beam is received after the transmission of the indication to the primary cell.

In a fourth aspect, in combination with the third aspects and one or more of the first and second aspects, the method may also include monitoring for the first message during a preset time window starting from transmission of the indication that the one or more channel measurements are to be performed.

In a fifth aspect, in combination with the third aspects and one or more of the first and second aspects, the detection of whether the one or more channel measurements are to be performed comprises detecting beam failure with respect to the secondary cell.

In a sixth aspect, in combination with one or more of the first through fifth aspects, a scrambling sequence used to encode the first message indicates to the UE to report the at least one preferred beam.

In a seventh aspect, in combination with one or more of the first through sixth aspects, a search space in which the first message is decoded indicates to the UE to report the at least one preferred beam.

In an eighth aspect, in combination with one or more of the first through seventh aspects, the first message comprises a physical downlink control channel (PDCCH).

In a ninth aspect, in combination with one or more of the first through eighth aspects, the first message comprises downlink control information (DCI) having one or more bits indicating to the UE to report the at least one preferred beam.

In a tenth aspect, in combination with one or more of the first through ninth aspects, the method may also include receiving a second message from the primary cell confirming activation of a transmission configuration state, wherein the data is communicated via the preferred beam in accordance with the transmission configuration state.

In an eleventh aspect, in combination with the tenth aspect and one or more of the first through ninth aspects, the second message received via the primary cell comprises a PDCCH scrambled with a cell-radio network temporary identifier (C-RNTI) associated with the secondary cell.

In a twelfth aspect, in combination with the tenth aspect and one or more of the first through ninth aspects, the second message is received via a control resource set of the primary cell.

In a thirteenth aspect, in combination with the tenth aspect and one or more of the first through ninth aspects, the method may also include monitoring for the second message during a preset time window starting from reception of the first message.

In a fourteenth aspect, in combination with the tenth aspect and one or more of the first through ninth aspects, the second message comprises a medium access control (MAC)-control element (CE) indicating the confirmation of the transmission configuration state.

In a fifteenth aspect, in combination with the fourteenth aspect and one or more of the first through ninth aspects, the data is communicated via the secondary cell in accordance with the transmission configuration state after the MAC-CE is received.

In a sixteenth aspect, in combination with the fifteenth aspect and one or more of the first through ninth aspects, the method may also include activating the transmission configuration state for the data communication after a preset time window or a preset number of slots starting from reception of the MAC-CE.

In a seventeenth aspect, a method for wireless communication may include transmitting, via a primary cell, a first message triggering reporting by a user-equipment (UE) of at least one preferred beam for communication via a secondary cell, receiving, from the UE via the primary cell, a report indicating the at least one preferred beam, and configuring a transmission configuration state in accordance with the preferred beam for communication via the secondary cell with the UE.

In an eighteenth aspect, in combination with the seventeenth aspect, the method may also include receiving, from the UE via the primary cell, an indication that one or more channel measurements are to be performed, wherein the first message triggering the reporting of the preferred beam is transmitted in response to the reception of the indication.

In a nineteenth aspect, in combination with one or more of the seventeenth through eighteenth aspects, configuring the transmission configuration state comprises transmitting a second message via the primary cell confirming activation of the transmission configuration state, and wherein the second message is transmitted during a preset time window starting from transmission of the first message.

In a twentieth aspect, in combination with one or more of the seventeenth through nineteenth aspects, the first message is transmitted during a preset time window starting from reception of the indication that the one or more channel measurements are to be performed.

In a twenty first aspect, in combination with one or more of the seventeenth through twentieth aspects, a scrambling sequence used to encode the first message indicates to the UE to report the at least one preferred beam.

In a twenty second aspect, in combination with one or more of the seventeenth through twenty first aspects, a search space in which the first message is encoded indicates to the UE to report the at least one preferred beam.

In a twenty third aspect, in combination with one or more of the seventeenth through twenty second aspects, the first message comprises a physical downlink control channel (PDCCH).

In a twenty fourth aspect, in combination with one or more of the seventeenth through twenty third aspects, the first message comprises downlink control information (DCI) having one or more bits indicating to the UE to report the at least one preferred beam.

In a twenty fifth aspect, in combination with one or more of the seventeenth through twenty fourth aspects, configuring the transmission configuration state comprises transmitting a second message via the primary cell confirming activation of the transmission configuration state.

In a twenty sixth aspect, in combination with the twenty fifth aspect and one or more of the seventeenth through twenty fourth aspects, the second message transmitted via the primary cell comprises a PDCCH scrambled with a cell-radio network temporary identifier (C-RNTI) associated with the secondary cell.

In a twenty seventh aspect, in combination with the twenty fifth aspect and one or more of the seventeenth through twenty fourth aspects, the second message is transmitted via a control resource set of the primary cell.

In a twenty eighth aspect, in combination with the twenty fifth aspect and one or more of the seventeenth through twenty fourth aspects, the second message comprises a medium access control (MAC)-control element (CE) indicating the confirmation of the transmission configuration state.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Moreover, operations illustrated in flow diagrams with dashed lines indicate optional features.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication at a communications device, comprising:
 a memory; and
 one or more processors coupled to the memory, wherein the one or more processors are configured to cause the communications device to:
  receive, on a first cell, an indication that one or more channel measurements are to be reported for a second cell for which beam failure is detected;
  transmit a first message that triggers reporting of at least one preferred beam for communication on the second cell, wherein:

the first cell is different from the second cell, and
the first message is transmitted in response to the indication that the one or more channel measurements are to be reported;
receive a report that indicates the at least one preferred beam; and
configure a transmission configuration state in accordance with the at least one preferred beam for communication on the second cell.

2. The apparatus of claim 1, wherein:
to configure the transmission configuration state, the one or more processors are further configured to cause the communications device to transmit a second message on the first cell, and
the second message confirms reconfiguration of the transmission configuration state.

3. The apparatus of claim 2, wherein the second message transmitted on the first cell comprises a physical downlink control channel (PDCCH) scrambled with a cell-radio network temporary identifier (C-RNTI) associated with the second cell.

4. The apparatus of claim 2, wherein to transmit the second message, the one or more processors are configured to cause the communications device to transmit the second message via a control resource set on the first cell.

5. The apparatus of claim 2, wherein the second message comprises a media access control-control element (MAC-CE) that indicates the reconfiguration of the transmission configuration state.

6. The apparatus of claim 2, wherein the one or more processors are further configured to cause the communications device to communicate with a user equipment (UE) via the at least one preferred beam on the second cell in accordance with the reconfiguration of the transmission configuration state.

7. The apparatus of claim 1, wherein:
to transmit the first message, the one or more processors are configured to cause the communications device to transmit the first message during a preset time window, and
the preset time window starts from reception of the indication that the one or more channel measurements are to be reported.

8. The apparatus of claim 1, wherein a scrambling sequence applied to encode the first message indicates to a user equipment (UE) to report the at least one preferred beam.

9. The apparatus of claim 1, wherein a search space in which the first message is transmitted indicates to a user equipment (UE) to report the at least one preferred beam.

10. The apparatus of claim 1, wherein the first message comprises a physical downlink control channel (PDCCH).

11. The apparatus of claim 1, wherein the first message comprises downlink control information (DCI) having one or more bits that indicate to a user equipment (UE) to report the at least one preferred beam.

12. The apparatus of claim 1, wherein to receive the report, the one or more processors are further configured to cause the communications device to receive the report that indicates the at least one preferred beam via a media access control-control element (MAC-CE).

13. The apparatus of claim 1, wherein:
the report includes a beam index associated with the at least one preferred beam, and
to receive the report, the one or more processors are further configured to cause the communications device to receive the report via a media access control-control element (MAC-CE).

14. The apparatus of claim 1, wherein:
the at least one preferred beam includes a plurality of preferred beams;
the report that indicates the at least one preferred beam includes a plurality of beam indices associated with the plurality of preferred beams; and
the one or more processors are further configured to cause the communications device to receive the report that indicates the at least one preferred beam via a media access control-control element (MAC-CE).

15. A method for wireless communication at a base station (BS), comprising:
receiving, on a first cell, an indication that one or more channel measurements are to be reported for a second cell for which beam failure is detected;
transmitting a first message that triggers reporting of at least one preferred beam for communicating on the second cell, wherein:
the first cell is different from the second cell, and
the first message is transmitted in response to the indication that the one or more channel measurements are to be reported;
receiving a report that indicates the at least one preferred beam; and
configuring a transmission configuration state in accordance with the at least one preferred beam for communication on the second cell.

16. The method of claim 15, wherein:
configuring the transmission configuration state comprises transmitting a second message on the first cell, and
the second message confirms reconfiguration of the transmission configuration state.

17. The method of claim 16, wherein the second message transmitted on the first cell comprises a physical downlink control channel (PDCCH) scrambled with a cell-radio network temporary identifier (C-RNTI) associated with the second cell.

18. The method of claim 16, wherein the second message is transmitted via a control resource set on the first cell.

19. The method of claim 16, wherein the second message comprises a media access control-control element (MAC-CE) that indicates the reconfiguration of the transmission configuration state.

20. The method of claim 16, further comprising communicating with a user equipment (UE) via the at least one preferred beam on the second cell in accordance with the reconfiguration of the transmission configuration state.

21. The method of claim 15, wherein the first message is transmitted during a preset time window starting from reception of the indication that the one or more channel measurements are to be reported.

22. The method of claim 15, wherein a scrambling sequence applied to encode the first message indicates to a user equipment (UE) to report the at least one preferred beam.

23. The method of claim 15, wherein a search space in which the first message is transmitted indicates to a user equipment (UE) to report the at least one preferred beam.

24. The method of claim 15, wherein the first message comprises a physical downlink control channel (PDCCH).

25. The method of claim 15, wherein the first message comprises downlink control information (DCI) having one or more bits that indicate to a user equipment (UE) to report the at least one preferred beam.

26. The method of claim 15, wherein receiving the report that indicates the at least one preferred beam is received comprises receiving the report via a media access control-control element (MAC-CE).

27. The method of claim 15, wherein:
the report includes a beam index associated with the at least one preferred beam, and
receiving the report comprises receiving the report via a media access control-control element (MAC-CE).

28. The method of claim 15, wherein:
the at least one preferred beam includes a plurality of preferred beams;
the report that indicates the at least one preferred beam includes a plurality of beam indices associated with the plurality of preferred beams; and
receiving the report indicating the at least one preferred beam comprises receiving the report via a media access control-control element (MAC-CE).

29. An apparatus for wireless communication, comprising:
means for receiving, on a first cell, an indication that one or more channel measurements are to be reported for a second cell for which beam failure is detected;
means for transmitting a first message that triggers reporting of at least one preferred beam for communication on the second cell, wherein:
the first cell is different from the second cell, and
the first message is transmitted in response to the indication that the one or more channel measurements are to be reported;
means for receiving a report that indicates the at least one preferred beam; and
means for configuring a transmission configuration state in accordance with the at least one preferred beam for communication on the second cell.

30. The apparatus of claim 29, wherein the report includes a beam index associated with the at least one preferred beam.

31. The apparatus of claim 29, wherein the first message comprises a physical downlink control channel (PDCCH).

32. The apparatus of claim 29, wherein the first message comprises downlink control information (DCI) having one or more bits that indicate to a user equipment (UE) to report the at least one preferred beam.

33. The apparatus of claim 29, wherein:
to configure the transmission configuration state, the means for configuring the transmission configuration state comprise means for transmitting a second message on the first cell, and
the second message confirms reconfiguration of the transmission configuration state.

34. The apparatus of claim 33, wherein the second message transmitted on the first cell comprises a physical downlink control channel (PDCCH) scrambled with a cell-radio network temporary identifier (C-RNTI) associated with the second cell.

35. The apparatus of claim 33, wherein the means for configuring the transmission configuration state comprise means for transmitting the second message via a control resource set on the first cell.

36. The apparatus of claim 29, wherein the means for receiving the report that indicates the at least one preferred beam comprise means for receiving the report via a media access control-control element (MAC-CE).

37. The apparatus of claim 29, wherein:
the report includes a beam index associated with the at least one preferred beam, and
to receive the report, the means for receiving the report that indicates the at least one preferred beam comprise means for receiving the report via a media access control-control element (MAC-CE).

38. The apparatus of claim 29, wherein:
the at least one preferred beam includes a plurality of preferred beams;
the report that indicates the at least one preferred beam includes a plurality of beam indices associated with the plurality of preferred beams; and
the means for receiving the report comprise means for receiving the report that indicates the at least one preferred beam via a media access control-control element (MAC-CE).

39. A non-transitory computer-readable medium for wireless communication at a communications device, comprising:
executable instructions that, when executed by one or more processors, cause the communications device to:
receive, on a first cell, an indication that one or more channel measurements are to be reported for a second cell for which beam failure is detected;
transmit a first message that triggers reporting of at least one preferred beam for communicating on the second cell, wherein:
the first cell is different from the second cell, and
the first message is transmitted in response to the indication that the one or more channel measurements are to be reported;
receive a report indicating the at least one preferred beam; and
configure a transmission configuration state in accordance with the at least one preferred beam for communicating on the second cell.

40. The non-transitory computer-readable medium of claim 39, wherein the report includes a beam index associated with the at least one preferred beam.

41. The non-transitory computer-readable medium of claim 39, wherein the first message comprises a physical downlink control channel (PDCCH).

42. The non-transitory computer-readable medium of claim 39, wherein the first message comprises downlink control information (DCI) having one or more bits that indicate to a user equipment (UE) to report the at least one preferred beam.

43. The non-transitory computer-readable medium of claim 39, wherein:
to configure the transmission configuration state, the executable instructions, when executed by the one or more processors, further cause the communications device to transmit a second message on the first cell, and
the second message confirms reconfiguration of the transmission configuration state.

44. The non-transitory computer-readable medium of claim 43, wherein the second message transmitted on the first cell comprises a physical downlink control channel (PDCCH) scrambled with a cell-radio network temporary identifier (C-RNTI) associated with the second cell.

45. The non-transitory computer-readable medium of claim 43, wherein the executable instructions, when executed by the one or more processors, further cause the communications device to transmit the second message via a control resource set on the first cell.

46. The non-transitory computer-readable medium of claim 39, wherein, to receive the report, the executable instructions, when executed by the one or more processors, further cause the communications device to receive the report that indicates the at least one preferred beam via a media access control-control element (MAC-CE).

47. The non-transitory computer-readable medium of claim 39, wherein:
- the report includes a beam index associated with the at least one preferred beam, and
- to receive the report, the executable instructions, when executed by the one or more processors, further cause the communications device to receive the report via a media access control-control element (MAC-CE).

48. The non-transitory computer-readable medium of claim 39, wherein:
- the at least one preferred beam includes a plurality of preferred beams;
- the report indicating the at least one preferred beam includes a plurality of beam indices associated with the plurality of preferred beams; and
- the executable instructions, when executed by the one or more processors, further cause the communications device to receive the report that indicates the at least one preferred beam via a media access control-control element (MAC-CE).

* * * * *